United States Patent

[11] 3,609,505

| [72] | Inventors | Glen E. Harland, Jr.;<br>Richard E. Lavengood, both of Kokomo, Ind. |
|---|---|---|
| [21] | Appl. No. | 876,266 |
| [22] | Filed | Nov. 13, 1969 |
| [45] | Patented | Sept. 28, 1971 |
| [73] | Assignee | General Motors Corporation<br>Detroit, Mich. |

[54] TEMPERATURE COMPENSATED VOLTAGE REGULATION SYSTEM
2 Claims, 2 Drawing Figs.

[52] U.S. Cl. ........................................... 320/35,
322/33, 322/81
[51] Int. Cl. ........................................... H02j 7/14
[50] Field of Search ........................................... 320/35, 36;
322/33, 34, 81; 323/4, 9, 28

[56] References Cited
UNITED STATES PATENTS
3,274,477  9/1966  Boyes ........................... 320/35
3,378,708  4/1968  Baker ........................... 322/28
3,522,482  8/1970  Thompson ..................... 317/31

*Primary Examiner*—William H. Beha, Jr.
*Assistant Examiner*—John M. Gunther
*Attorneys*—E. W. Christen, C. R. Meland and Tim G. Jagodzinski ABSTRACT: A battery charging system includes a voltage regulator having a drive section and an output section. The drive section contains all of the temperature sensitive drive components of the voltage regulator. The power section contains all of the heat-producing power components of the voltage regulator. The drive section is mounted on the battery in intimate heat-conducting relationship so that the temperature sensitive drive components are compensated for variations in the temperature of the battery. The power section is mounted on the generator out of intimate heat-conducting relationship with the drive section so that the temperature sensitive drive components are not effected by the heat-producing power components.

INVENTORS
Glen E. Harland, Jr. &
BY Richard E. Lavengood
Feue B. Jagodzinski
ATTORNEY

TEMPERATURE COMPENSATED VOLTAGE REGULATION SYSTEM

This invention relates to a battery charging system. More particularly, this invention relates to a temperature compensated voltage regulator for a battery charging system.

In a typical battery charging system, a voltage regulator controls the amount of charging voltage applied by a generator to a battery. The life expectancy of the battery is substantially enhanced when the charging voltage is supplied at an optimum charging level. However, the optimum charging level is a function of the temperature of the battery. Accordingly, it is desirable that the voltage regulator be precisely compensated for variations in the temperature of the battery. Several techniques have been proposed for accomplishing this result.

One proposed technique temperature compensates the voltage regulator by mounting a temperature sensitive resistor in intimate heat conducting relationship with the battery. However, other temperature sensitive drive components in the voltage regulator are affected by variations in the ambient temperature voltage regulator thereby causing inaccurate voltage regulation. Therefore, this temperature compensation technique is inadequate.

Another proposed technique temperature compensates the voltage regulator by mounting the entire voltage regulator in intimate heat conducting relationship with the battery. However, the heat producing power components in the voltage regulator affect the ambient temperature of the voltage regulator thereby causing inaccurate voltage regulation. Therefore, this temperature compensation technique is inadequate.

According to the invention, a battery charging system includes a voltage regulator which is completely temperature compensated without incurring any of the previously described disadvantages. In general, this result is accomplished by separating the voltage regulator into a drive section and a power section. The drive section contains all of the temperature sensitive drive components of the voltage regulator including a temperature sensitive resistor. The power section contains all of the heat producing power components of the voltage regulator. The drive section is mounted on the battery in intimate heat conducting relationship so that the temperature sensitive drive components are compensated for variations in the temperature of the battery. The power section is mounted on the generator out of intimate heat conducting relationship with the drive section so that the heat produced by the power components does not affect the operation of the drive components.

The invention may be best understood by reference to the following detailed description of a preferred embodiment when considered in conjunction with the accompanying drawing, in which.

Figure 1:
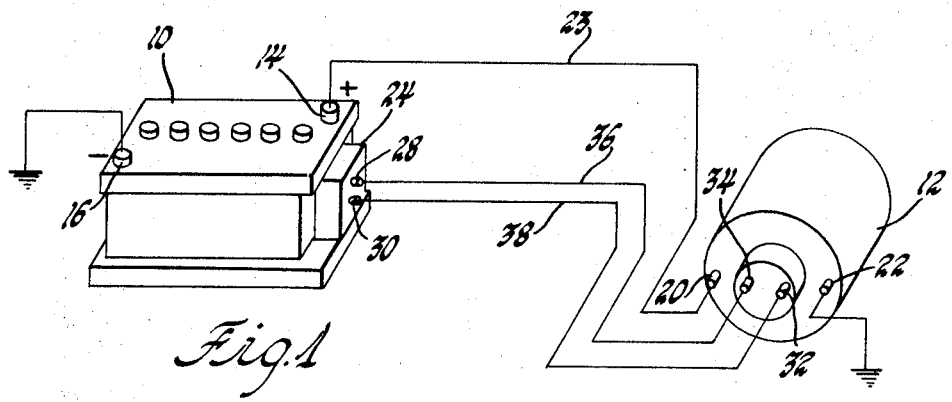
FIG. 1 is a pictorial view of a battery charging system incorporating the principles of the invention.
Figure 2:
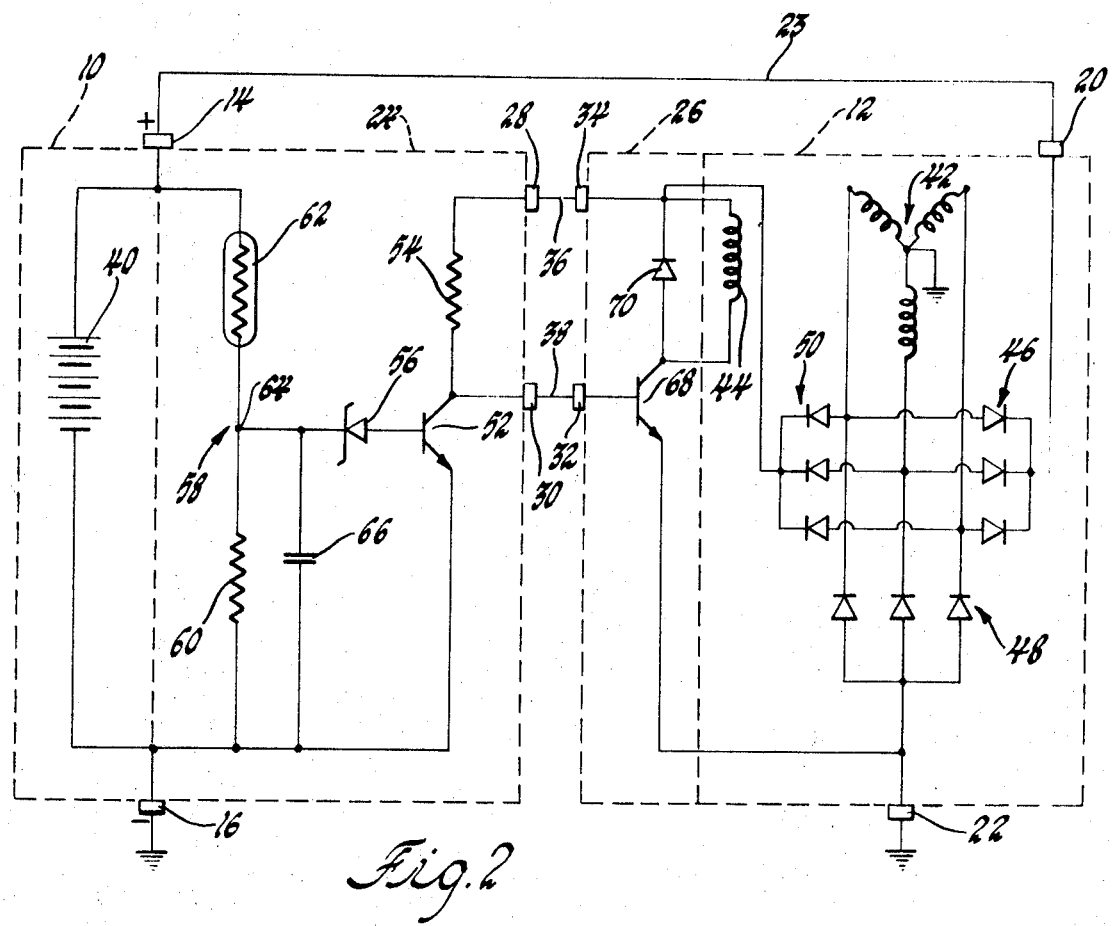
FIG. 2 is a schematic diagram of a battery charging system incorporating the principles of the invention.

Referring to FIGS. 1 and 2, a battery charging system includes a battery 10 and a generator 12. The battery 10 includes a positive or power terminal 14 and a negative or grounded terminal 16. The generator 12 includes a charging terminal 20 and a grounded terminal 22. A charging conductor 23 connects the charging terminal 20 of the generator 12 to the power terminal 14 of the battery 10 for charging the battery 10 from the generator 12. It will be appreciated that the battery 10 is electrically connected with a load (not shown) and that the generator 12 is mechanically connected to a prime mover (not shown). As described herein, the battery 10 is an electrolytic storage battery and the generator 12 is an AC voltage generator. However, it should be understood that the battery 10 may be virtually any rechargeable battery and the generator 14 may be virtually any controllable voltage generator.

The illustrated battery charging system also includes a voltage regulator comprising a drive section 24 and a power section 26. The drive section 24 is mounted on the battery 10 in intimate heat conducting relationship with the battery 10. The output section 26 is mounted on the generator 12 out of intimate heat conducting relationship with the drive section 24. The drive section 24 includes an input terminal 28 and an output terminal 30. The power section 26 includes an input terminal 32 and an output terminal 34. A supply conductor 36 connects the output terminal 34 of the power section 26 with the input terminal 28 of the drive section 24 for applying an energizing voltage from the power section 26 to the drive section 24. A drive conductor 38 connects the output terminal 30 of the drive section 24 with the input terminal 32 of the power section 26 for applying a drive voltage from the drive section 24 to the power section 26.

Referring particularly to FIG. 2, the battery 10 includes a plurality of electrolytic cells 40 connected series between the positive terminal 14 and the negative terminal 16. The generator 12 includes a polyphase output winding 42 and a field winding 44. A first group of rectifiers 46 is connected anode-to-cathode from the output winding 42 to the charging terminal 20 of the generator 12. A second group of rectifiers 48 is connected cathode-to-anode from the output winding 42 to the grounded terminal 22 of the generator 12. A third group of rectifiers 50 is connected anode-to-cathode from the output winding 42 to the output terminal 34 of the power section 26.

The drive section 24 of the voltage regulator includes a drive switching device provided by an NPN junction transistor 52 having base, emitter and collector electrodes. The collector electrode of the transistor 52 is connected to the input terminal 28 of the drive section 24 through a biasing resistor 54. The emitter electrode of the transistor 52 is connected directly to ground. A voltage responsive device is provided by a Zener diode 56 having anode and cathode electrodes. The anode electrode of the diode 56 is connected to the base electrode of the transistor 52. A voltage sensing circuit is provided by a voltage divider network 58 including an ordinary resistor 60 and a temperature sensitive resistor or thermistor 62. The resistors 60 and 62 are connected in series between the positive power terminal 14 and the negative power terminal 16 of the battery 10. The cathode electrode of the diode 56 is connected to a junction 64 between the resistors 60 and 62. A filter capacitor 66 is connected form the junction 64 to ground.

The power section 26 of the voltage regulator includes a power switching device provided by an NPN junction transistor 68 having base, emitter and collector electrodes. The base electrode of the transistor 68 is connected to the input terminal 32 of the power section 26. The emitter electrode of the transistor 68 is connected directly to ground. The collector electrode of the transistor 68 is connected to the output terminal 34 of the power section 26 through the field winding 44 of the generator 12. A voltage suppression diode 70 is connected across the field winding 44.

In operation, the output winding 42 produces a polyphase output voltage having a magnitude which increases is response to the application of an energizing voltage to the field winding 44. A first bridge rectifier, formed by the first and second groups of rectifiers 46 and 48, applies a charging voltage from the output winding 42 to the charging terminal 20 of the generator 12. The charging voltage is a full-wave rectified voltage having a magnitude proportional to the magnitude of the polyphase output voltage. The charging conductor 23 applies the charging voltage from the charging terminal 20 of the generator 12 to the power terminal 14 of the battery 10 to charge the electrolytic cells 40. Thus, a charging voltage is applied from the output winding 42 of the generator 12 to the power terminal 14 of the battery 10 by a charging circuit including the first and second group of rectifiers 46 and 48 and the charging conductor 23.

A second bridge rectifier, formed by the second and third groups of rectifiers 48 and 50, applies an energizing voltage from the output winding 42 of the generator 12 to the output terminal 34 of the power section 26. The power transistor 68 effectively applies the energizing voltage to the field winding 44 when the transistor 68 is turned on or rendered fully conductive. Hence, an energizing voltage is applied to the filed winding 44 by an energizing circuit including the second and third groups of rectifiers 48 and 50 and the power transistor 68.

The supply conductor 36 applies the energizing voltage from the output terminal 34 of the power section 26 to the input terminal 28 of the drive section 24. Assuming the drive transistor 52 in the drive section 24 is initially turned off or rendered fully nonconductive, the baising resistor 54 applies a drive voltage from the input terminal 28 to the output terminal 30 of the drive section 24. The drive conductor 38 couples the drive voltage from the output terminal 30 of the drive section 24 to the input terminal 32 of the power section 26. Consequently, the drive voltage is applied to the base electrode of the power transistor 68 so that the transistor 68 is turned on or rendered fully conductive. In this condition, the transistor 68 effectively applies an energizing voltage to the field winding 44. Hence, the magnitude of the charging voltage applied by the generator 12 to the battery 10 increases.

The voltage sensing circuit 58 monitors the magnitude of the charging voltage and applied a signal voltage to the Zener diode 56 having a magnitude proportional to the magnitude of the charging voltage as determined by the voltage divider action of the resistors 60 and 62. When the magnitude of the charging voltage rises above a predetermined regulating level, the magnitude of the signal voltage rises above a reference level determined by the breakdown voltage characteristic of the Zener diode 56. In response to an increase in the magnitude of the signal voltage above the reference lever, the Zener diode 56 is rendered conductive to apply a bias voltage to the base electrode of the drive transistor 52. The magnitude of the bias voltage equals the difference between the magnitude of the signal voltage and the reference level. The drive transistor 52 is turned on or rendered fully conductive when the magnitude of the bias voltage rises above a trigger level determined by the downward voltage characteristic of the base-emitter junction of the transistor 52. In this condition, the drive transistor 52 effectively connects the output terminal 30 of the drive section 24 to ground. Similarly, the drive conductor 38 connects the input terminal 32 of the power section 26 to ground. Consequently, the drive voltage is removed from the base electrode of the power transistor 68 so that the transistor 68 is turned off or rendered fully nonconductive. In this condition, the power transistor 68 effectively interrupts the application of the energizing voltage to the field winding 44. Accordingly, the magnitude of the charging voltage applied by the generator 12 to the battery 10 decreases.

When the magnitude of the charging voltage decreases below the predetermined regulating level, the magnitude to the signal voltage decreases below the reference level. In response to a decrease in the magnitude of the signal voltage below the reference level, the Zener diode 56 is rendered nonconductive to remove the bias voltage from the base electrode of the drive transistor 52 so that the transistor 52 is turned off or rendered fully nonconductive. Accordingly, the power transistor 68 is turned on or rendered fully conductive as previously described, and the charging voltage applied by the generator 12 to the battery 10 again increases. It will be appreciated that this cycle is continually repeated so as to nominally maintain the charging voltage at the predetermined regulating level.

The filter capacitor 66 shunts spurious noise signals from the junction 64 to ground so as to prevent the noise signals from influencing operation of the Zener diode 56. The suppression diode 70 dissipates the surge or flyback voltage generated by the field winding 44 when the power transistor 68 is turned off or rendered fully nonconductive. The drive section 24 of the voltage regulator is electrically isolated from the battery 10 except for the voltage sensing circuit 58. However, since the voltage sensing circuit 58 is connected directly across the positive and negative terminals 14 and 16 of the battery 10, the resistance values of the resistors 60 and 62 are selected so as to minimize the current drain through the voltage sensing circuit 58.

In a battery charging system, it can be demonstrated that the useful life of the battery is substantially prolonged when the magnitude of the charging voltage is maintained at an optimum charging level. However, the optimum charging level is an inverse function of the temperature of the battery. Hence, as the battery temperature increases, the optimum charging level decreases. Therefore, it is desirable to temperature compensate the voltage regulator. That is, it is desirable to alter the regulating level of the voltage regulator in accordance with changes in the optimum charging level due to variations in the temperature of the battery.

Referring again to FIGS. 1 and 2, the regulating level of the illustrated voltage regulator is completely compensated for variations in the temperature of the battery 10. Since the drive section 24 of the voltage regulator is mounted in intimate heat conducting relationship with the battery 10, the voltage regulator is temperature compensated by the temperature sensitive resistor or thermistor 62 which exhibits a negative temperature coefficient. Thus, as the temperature of the battery 10 increases, the resistance of the thermistor 62 decreases and the magnitude of the signal voltage produced by the voltage sensing circuit 58 increases for a given magnitude of the charging voltage. Consequently, the regulating level of the voltage regulator is correspondingly decreased so as to compensate the voltage regulator for the variations in the temperature of the battery 10. However, this temperature compensation of the voltage regulator is only partially effective.

The breakdown voltage characteristic of the Zener diode 56 and the forward voltage characteristic of the base-emitter junction of the drive transistor 52 are also temperature sensitive. Hence, as the temperature of the battery 10 increases, the reference level determined by the breakdown voltage characteristic of the Zener diode 56 decreases and the trigger level determined by the forward voltage characteristic of the base-emitter junction of the drive transistor 52 increases. Therefore, it will be apparent that the temperature sensitivity of both the Zener diode 56 and the drive transistor 52 affects the regulating level of the voltage regulator. However, since the drive section 24 of the voltage regulator is mounted in intimate heat conducting relationship with the battery 10, the Zener diode 56 and the drive transistor 52 are directly exposed to the exact temperature of the battery 10. Thus, the reference level and the trigger level are partially determined by the temperature of the battery 10. Accordingly, the temperature characteristic of the thermistor 62 may be selected so as to precisely compensate the voltage regulator for the temperature sensitivity of the Zener diode 56 and the drive transistor 52.

In addition, since the power section 26 of the voltage regulator is mounted on the generator 12 out of intimate heat conducting relationship with the drive section 24, the heat produced by the power transistor 68 and the suppression diode 70 is not transferred to the drive section 24. Consequently, the breakdown voltage characteristic of the Zener diode 56 and the forward voltage characteristic of the base-emitter junction of the drive transistor 52 are insensitive to the heat generated in the power section 26. Therefore, the regulating level of the voltage regulator as determined by the temperature sensitive drive components of the drive section 24 is not affected by the heat producing power components of the power section 26. This feature is absolutely indispensable where it is desired to achieve very precise voltage regulation.

It is to be noted that the illustrated voltage regulator is shown for demonstration purposes only, and that various alternations may be made thereto without departing from the spirit and scope of the invention. Thus, additional components may be added to the voltage regulator to improve its performance or to protect it from damage due to a malfunction. Similarly, the illustrated components of the voltage regulator may be variously modified for the same reasons. For example, the drive transistors 52 and the power transistor 68 may be provided by Darlington amplifiers in order to obtain a high current gain for stabilizing the regulating level of the voltage regulator over changing conditions of electrical load and generator speed.

Preferably, the drive section 24 and the power section 26 of the voltage regulator are fabricated as separate integrated circuit. Hence, the drive section 24 may be mounted on the battery 10 in virtually any convenient location, inside or outside the battery 10, as long as it is mounted in intimate heat conducting relationship with the battery 10. Likewise, the power section 26 may be mounted at any convenient location, inside or outside of the generator 12, as long as it is mounted out of intimate heat conducting relationship with the drive section 24.

As used in the appended claims, the term connected is to be taken in its indirect sense. Thus, a first element may be connected to a second element seen though a third or more elements are interposed between the first and second elements. Similarly, as used in the appended claims, the term transistor is to be taken to encompass a Darlington amplifier.

What is claimed is:

1. In an electrical system including a storage battery having a power terminal, a generator having an output winding and a field winding, the output winding providing an output voltage having a magnitude which increases in response to the application of an energizing voltage to the field winding, a charging circuit connected between the output winding of the generator and the power terminal of the battery for applying a charging voltage to the battery having a magnitude proportional to the magnitude of the output voltage, and an energizing circuit connected between the output winding and the field winding of the generator for applying an energizing voltage to the field winding; a voltage regulator circuit comprising: a drive section including a drive switching device which is normally turned off and which is turned on in response to the application of a bias voltage having a magnitude in excess of a temperature sensitive trigger level determined by the drive device, a voltage responsive device connected with the drive switching device for applying a bias voltage to the drive switching device having a magnitude determined by the difference between the magnitude of a signal voltage applied to the voltage responsive device and a temperature sensitive reference level defined by the voltage responsive device, and a voltage sensing circuit connected with the power terminal of the battery and with the voltage responsive device for applying a signal voltage to the voltage responsive device having a magnitude which is proportional to the magnitude of the charging voltage applied to the power terminal of the battery by the charging circuit, the voltage sensing circuit including a temperature sensitive device for varying the magnitude of the signal voltage in response to variations to temperature of the battery, the drive section mounted on the battery in intimate heat conducting relationship so that the temperature sensitive drive components in the drive section are completely compensated for variations in the temperature of the battery; and a power section including a heat producing power switching device which is normally turned on, the power switching device connected with the drive switching device so that the power switching device is turned off when the drive transistor is turned on, and the power switching device connected in the energizing circuit for applying an energizing voltage to the field winding when the power switching device is turned on, the power section mounted on the generator out of intimate heat conducting relationship with the drive section so that the heat produced by the power components in the power section does not affect the operation of the temperature sensitive drive components in the drive section.

2. In an electrical system including a storage battery having a power terminal, a generator having an output winding and a field winding, the output winding providing an output voltage having a magnitude which increases in response to the application of an energizing voltage to the field winding, a charging circuit connected between the output winding of the generator and the power terminal of the battery for applying a charging voltage to the battery having a magnitude proportional to the magnitude of the output voltage, and an energizing circuit connected between the output winding and the field winding of the generator for applying an energizing voltage to the field winding; a solid state voltage regulator circuit comprising: a drive section including a drive transistor which is normally rendered fully nonconductive and which is rendered fully conductive in response to the application of a bias voltage having a magnitude in excess of a temperature sensitive trigger level determined by the drive transistor, a voltage responsive diode connected with the drive transistor for applying a bias voltage to the drive transistor having a magnitude determined by the difference between the magnitude of a signal voltage applied to the voltage responsive diode and a temperature sensitive reference level defined by the voltage responsive diode, and a voltage sensing circuit connected with the power terminal of the battery and with the voltage responsive diode having a magnitude which is proportional to the magnitude of the charging voltage applied to the power terminal of the battery by the charging circuit, the voltage sensing circuit including a voltage divider network having a temperature sensitive resistor for varying the magnitude of the signal voltage in response to variations in the temperature of the battery, the drive section mounted in intimate heat conducting relationship with the battery so that the temperature sensitive drive components in the drive section are completely compensated for variations in the temperature of the battery; and a power section including a heat producing power transistor which is normally rendered fully conductive, the power transistor connected with the drive transistor so that the power transistor is rendered fully nonconductive when the drive transistor is rendered fully conductive, and the power transistor connected in the energizing circuit applying an energizing voltage to the field winding when the power transistor is rendered fully conductive, the power section mounted on the generator out of intimate heat conducting relationship with the drive section so that the heat produced by the power components in the power section does not affect the operation of the temperature sensitive drive components in the drive section.

PO-1050
(5/69)

UNITED STATES PATENT OFFICE
CERTIFICATE OF CORRECTION

Patent No. __3,609,505__     Dated __September 28, 1971__

Inventor(s) __Glen E. Harland, Jr. et al__

It is certified that error appears in the above-identified patent and that said Letters Patent are hereby corrected as shown below:

Column 2, line 15, after "connected" insert -- in --; line 42, "form" should be -- from --.

Column 3, line 2, "filed" should be -- field --; line 10, "baising" should be -- biasing --; line 22, "applied" should be -- applies --; line 31, "lever" should be -- level --; line 38, "downward" should be -- forward --; line 51, "to" should be -- of --.

Column 4, line 59, "52" should be -- 42 --; line 68, "alternations" should be -- alterations --; line 75, "transistors" should be -- transistor --.

Column 5, line 7, "circuit" should be -- circuits --; line 17, "seen" should be -- even --.

Column 6, claim 2, line 34, after "diode" insert -- for applying a signal voltage to the voltage responsive diode --.

Signed and sealed this 4th day of April 1972.

(SEAL)
Attest:

EDWARD M. FLETCHER, JR.
Attesting Officer

ROBERT GOTTSCHALK
Commissioner of Patents